United States Patent [19]

Malo et al.

[11] 4,226,973

[45] Oct. 7, 1980

[54] PROCESS FOR UPGRADING PREPOLYMER PARTICLES

[75] Inventors: Russell V. Malo, Munster, Ind.; Gary A. Gustafson, Naperville; Ronald E. Bockrath, Aurora, both of Ill.

[73] Assignee: Standard Oil Company (Indiana), Chicago, Ill.

[21] Appl. No.: 51,043

[22] Filed: Jun. 22, 1979

[51] Int. Cl.$^2$ ............................................. C08G 63/26
[52] U.S. Cl. ..................... 528/481; 528/480; 528/503
[58] Field of Search ....................... 528/480, 481, 503

[56] References Cited

U.S. PATENT DOCUMENTS

| 3,585,259 | 6/1971 | Lefferts et al. ................. 528/481 X |
| 3,728,309 | 4/1973 | Maxion ................. 528/481 |
| 3,756,990 | 9/1973 | Jaeger et al. ......................... 528/481 |
| 3,804,811 | 4/1974 | Rose et al. ......................... 528/481 |

*Primary Examiner*—Lucille M. Phynes
*Attorney, Agent, or Firm*—Gregory E. Croft; William T. McClain; William H. Magidson

[57] ABSTRACT

A horizontal, agitated, twin-shaft, jacketed vessel with adjustable vanes performs the functions of drying, crystallization, and solid phase polymerization for upgrading prepolymer particles.

9 Claims, 6 Drawing Figures

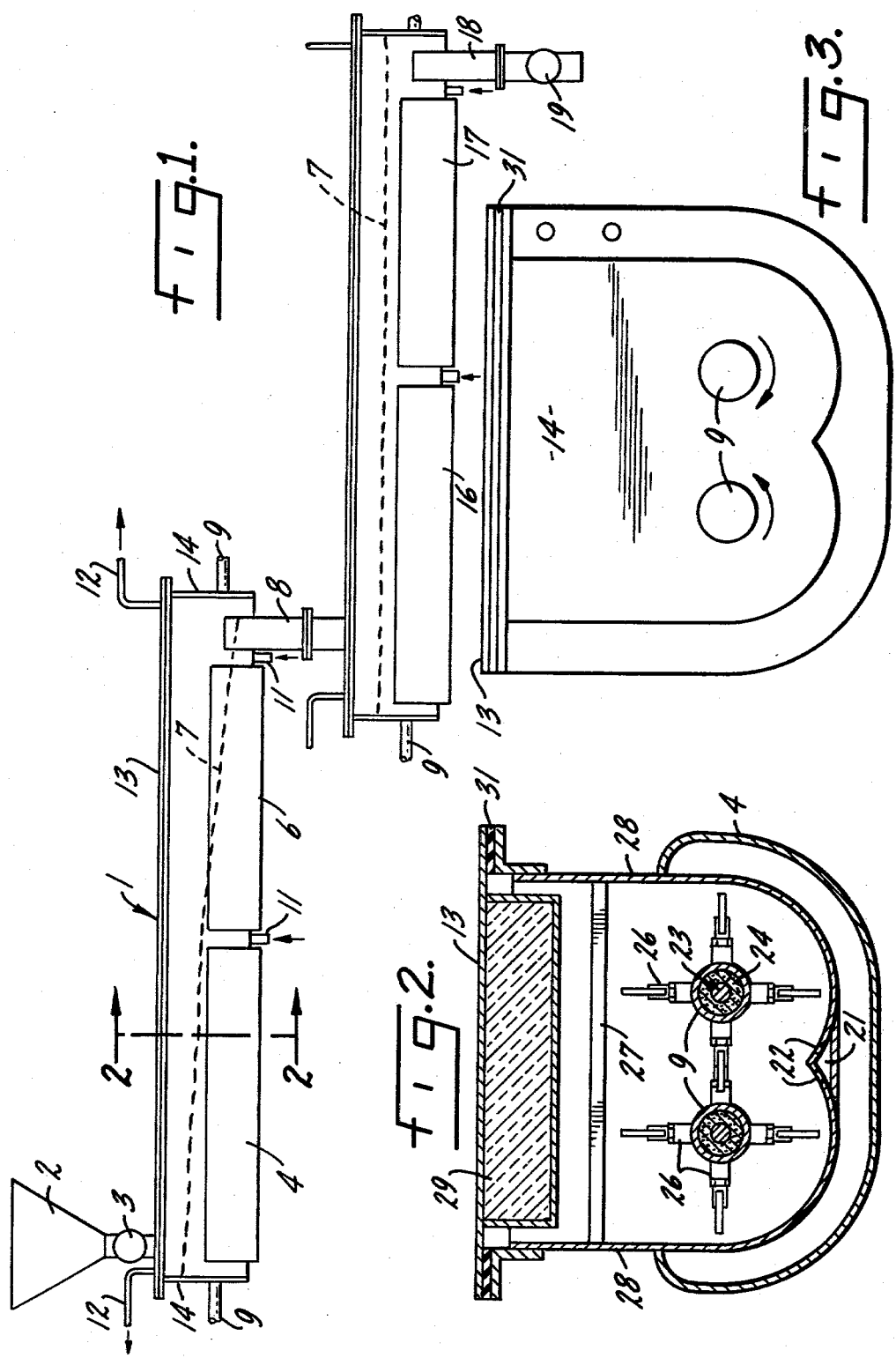

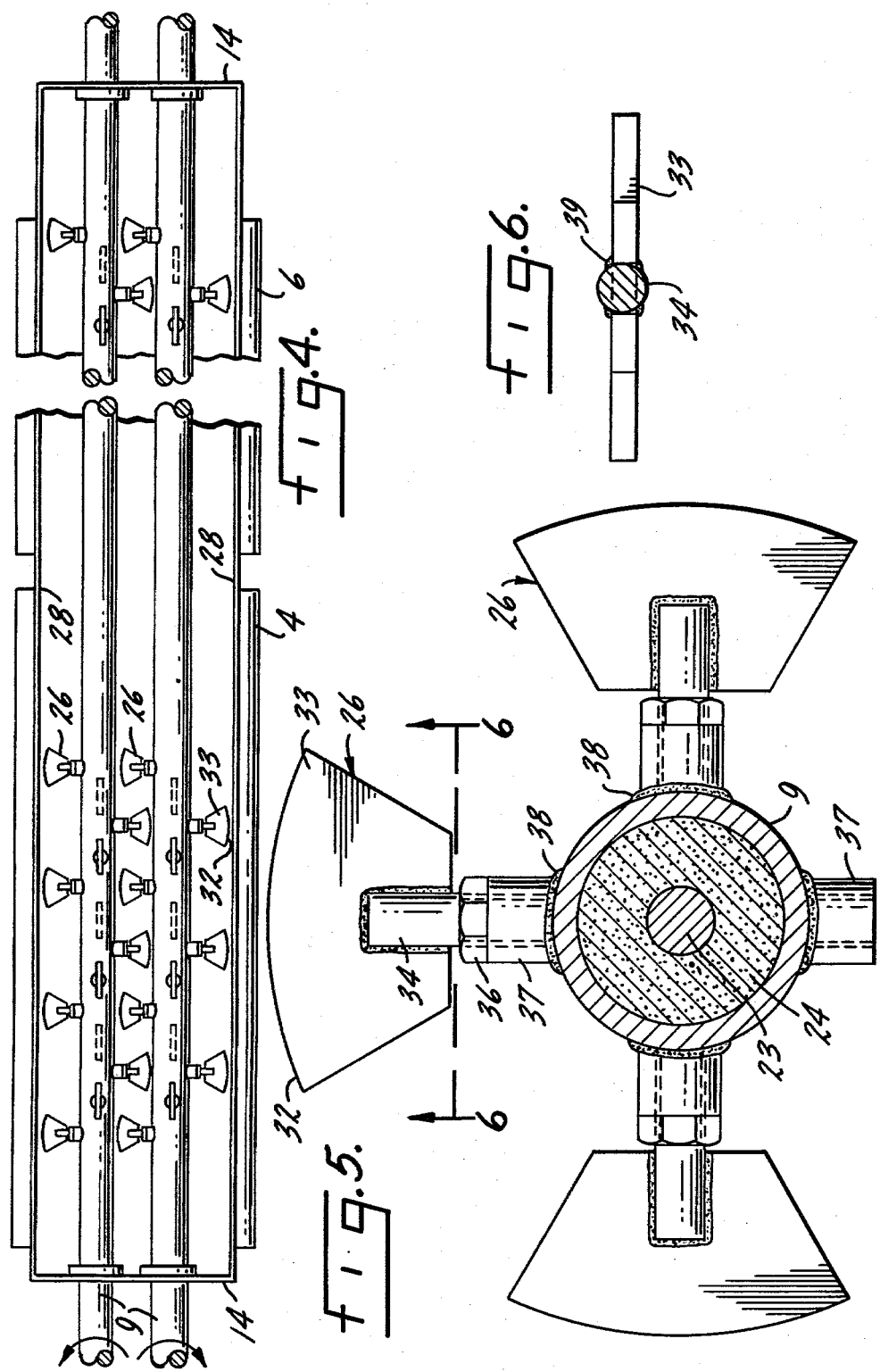

PROCESS FOR UPGRADING PREPOLYMER PARTICLES

BACKGROUND OF THE INVENTION

Field of the Invention

This invention relates to a process for upgrading prepolymer particles. More specifically, this invention relates to a process for drying, crystallizing, and/or solid-state polymerizing polyester prepolymer particles through the use of a particular apparatus referred to herein as a "thermovane processor."

General Background

Polyesters have commonly been synthesized by ester exchange reactions between pairs of reactants comprising diols plus dicarboxylic acid esters or diol esters plus dicarboxylic acids. Double ester-exchange reactions with dicarboxylic acid diesters also yield polyesters but have had lesser practical value.

Poly(ethylene terephthalate) (PET), which is one of the most commercially important polyesters, has been widely manufactured by an alcoholysis reaction wherein ethylene glycol is reacted with dimethyl terephthalate. As fiber grade terephthalic acid became available, however, substantial quantities of PET have been produced by direct esterfication, wherein ethylene glycol is reacted directly with terephthalic acid, giving off water as a by-product. This esterification reaction is an equilibrium process wherein its progress, and hence molecular weight, is determined by the efficiency with which water is removed from the reaction. For low molecular weight products, it is normally sufficient to allow liberated water to be driven off at the temperature of reaction with a sweep of dry gas such as nitrogen. Products of higher molecular weight can be obtained either by (a) carrying out the reaction in a boiling inert organic solvent with azeotropic entrainment, or by (b) precondensation at moderate temperatures, followed by further condensation in the latter stages of the reaction under reduced pressures. Because the product must ordinarily be kept molten, the mass transfer and heat transfer problems associated with the high viscosity of the polyester melt are considerable. Although melt polycondensation can be conducted up to relatively high molecular weight havig an inherent viscosity of approximately 0.6–1.0 dl./g., certain problems regarding product quality occur. For example, the color of the polyester is adversely affected and may become somewhat yellow due to prolonged exposure to heat. It also may turn grey if an excess of catalyst is used to attain faster rates of polycondensation. Additionally, melt prepared polyester is unsuitable for beverage container manufacture due to excessive levels of acetaldehyde. The acetaldehyde and its precursors must subsequently be removed by heat treatment after pellet preparation either under vacuum or with an inert gas sweep. For this reason, it is preferable that the polyester be extruded into rods which are quenched, pelletized, and dried to yield an amorphous prepolymer product having an inherent viscosity (I.V.) of about 0.4–0.55 dl/g.

The molecular weights of polyester prepolymers prepared by melt polymerization are limited by the thermal stability and melt viscosity of the polyester. Higher molecular weights, however, can be obtained from crystalline polyesters by solid-state polymerization, which is generally accomplished by heating prepolymer particles of the polyester at a temperature slightly below their melting point while under reduced pressure and/or while hot inert gas, such as nitrogen, is passed through the particles. The solid-state polymerization procedure generally cannot be used with amorphous copolymer particles, however, because the amorphous particles stick together when heated above their glass transition temperature. This problem is compounded by the additional heat given off by the exothermic crystallization reaction induced by heating the particles to solid-state temperatures, which causes temperature control difficulties as well as melting and further sticking of the particles. Thus, in order to prepare a quality high molecular weight polyester, such as PET for example, it is necessary to carry out the operation of drying, crystallizing, and solid-state polymerizing the prepolymer. To some extent these operations overlap each other at any given conditions. Generally speaking, however, drying the particles prior to crystallization is desirable because, as the temperature of the particle increases due to crystallization, plasticization and sticking of the particles may occur due to the presence of surface moisture. At times the crystallization has been accomplished by various devices such as vacuum tumble driers and others (See British Pat. No. 1,451,718). Solid state polycondensation has been attempted by a variety of means such as vertical bed reactors, fluid beds, and rotary vacuum driers. From a commercial standpoint, the process of drying, crystallizing, and solid-state polymerizing the particles using several different pieces of equipment can be expensive.

Description of the Prior Art

Various aspects of polyester production have been addressed by a number of patents. For example, U.S. Pat. No. 2,975,483 (Cooper et al.) teaches a method for producing polyester prepolymer pellets by extruding the polyester into continuous strands, cooling the surface of the strands with a liquid coolant, and cutting the strands into pellets.

U.S. Pat. No. 3,544,525 (Balint et al.) teaches further the fluidization of the pellets in a vertical vessel to crystallize the polyester and thereafter transferring the crystallized pellets to an additional vessel for drying and/or solid-state polymerization. The polymerization is accomplished by passing hot gas (160°–210° C.) through the pellets until the desired moisture level and/or molecular weight is achieved. In such a process, it is necessary that 80 percent of the pellets in the crystallizer vessel have at least 50 percent crystallinity to prevent plugging due to sticking of the pellets to each other.

U.S. Pat. No. 3,746,688 (Berkau) teaches drying amorphous polyethylene terephthalate flakes by exposing the flakes to a temperature below the crystallization temperature under high vacuum until the moisture content is reduced to at most 0.05 percent. The dried flakes can then be crystallized with less tendency for sticking.

British Pat. No. 1,451,718 teaches a method and apparatus for crystallizing and drying amorphous polyesters, wherein amorphous polyester granules are introduced into a horizontal, cylindrical, double-shell vessel containing a single rotating shaft having numerous paddles disposed radially therefrom. The angle of the paddle surfaces relative to the shaft can be adjusted such that the residence time of the granules in any given section of the vessel can be controlled. A heating fluid is passed through the double-shell walls of the vessel to provide heat to the polyester granules as they are flung against the inner wall of the vessel by the rotating paddles. The outer surface of the granules is crystallized in this manner, thus reducing the tendency for agglomeration during subsequent drying operations.

U.S. Pat. No. 3,969,324 (Berkau) teaches a continuous process for drying, crystallizing, and solid-state polymerizing polyester flakes through use of a screw-type conveyor, wherein the amorphous flake consecutively passes through a drying zone at less than 80° C., a crystallization zone at 230°–240° C., and a polymerization zone at 230°–240° C. The entire process occurs under a vacuum of about 0.5 mm. Hg.

Although unrelated to polyester drying, crystallization, or solid-state polymerization, U.S. Pat. No. 3,678,596 (Kubo) discloses an apparatus which contains many features common to the apparatus used in the process of this invention. Specifically, Kubo teaches a horizontal dryer for continuously drying high density slurries. The dryer comprises a cylindrical vessel containing a pair of parallel, rotating hollow shafts provided with a number of radially disposed paddles which intermesh as the shafts are rotated in opposite directions. Hot gases are passed in the direction of slurry flow through the shafts and a hollow jacket partially surrounding the shafts. The two exhaust gas streams are combined and circulated through the vessel in the reverse direction and vented through an exhaust port at the front of the dryer. However, there is no suggestion that a similar apparatus such as the thermovane processors described herein could be used for upgrading polyester particles.

SUMMARY OF THE INVENTION

Generally, this invention resides in a process for upgrading prepolymer particles comprising continuously conveying the prepolymer particles through a thermovane processor under an inert gas sweep at conditions sufficient to achieve crystallization and/or solid-state polymerization without sticking of the particles. The prepolymer is preferably selected from the group consisting of (a) homopolymers and (b) partially precrystallized copolymers having a degree of crystallization of at least about 5 percent.

For purposes herein, "polyester" refers to any heterochain macromolecular compound possessing a plurality of carboxylate ester groups as components of the skeletal structure. As such, the term includes copolyesters as well as homopolyesters, whether linear or branched, particularly including poly(ethylene terephthalate) and its related copolyesters. The polyester can be formed from a wide variety of hydroxyl and carboxyl moieties. Suitable sources of hydroxyl moieties include diols, such as ethylene glycol, proplyene glycol, butylene glycol, hexylene glycol, dodecylene glycol, etc., and others such as 1,4-cyclohexane dimethanol, etc. Still others include polyols such as 1,1,1-trimethylol ethane, 1,1,1-trimethylol propane, pentaerythritol, 1,2,6-hexanetriol, etc. Suitable sources of carboxyl moieties include dicarboxylic acids such as terephthalic acid, isophthalic acid, naphthalene-2,6-dicarboxylic acid, etc. Other polyfunctional sources of carboxyl moieties include trimellitic anhydride, pyromellitic anhydride, butane tricarboxylic acid, etc. Still other suitable sources of carboxyl and hydroxyl moieties include mixed tri-functional compounds such as dimethyl propionic acid, etc.

The term "prepolymer particle" shall mean polyester particles of low or intermediate molecular weight as are produced by melt polymerization, extrusion, and cutting. Prepolymers typically have an inherent viscosity (I.V.) of about 0.40 to 0.55 dl/g. (As used herein, inherent viscosities are determined by dissolving 0.1 grms of polyester in 25 ml. of 60% phenol:40% tetrachloroethane by weight. The viscosity is measured at 30° C. using a 1C Ubbelohde viscometer). Such prepolymer particles can contain other constituents in addition to the polyester, such as anti-stick agents, pigments, stabilizers, fillers, etc.

The term "thermovane processor" shall mean a horizontal, jacketed vessel of the type illustrated and described herein containing counter-rotating twin shafts which have a plurality of paddles (preferably adjustable) thereon, and preferably having spaced along the length of the vessel numerous orifices adapted to provide a purge of inert gas.

The term "upgrading" is used to denote a changing of the prepolymer particles in a manner generally considered desirable in achieving the final product, and particularly includes drying, crystallization, and further polymerization (as measured by inherent viscosity.)

It has been found that a thermovane processor has the unique feature of allowing the prepolymer particles to be agitated independently of their conveyance through the machine. This permits operating temperatures approaching the melting point of the polymer without experiencing pellet agglomeration. Because of the built-in versatility of the thermovane processor, a wide range of polymers can be dried, crystallized, and/or solid-state polymerized without sticking. The thermovane processor is capable of removing the heat of crystallization which, if not removed, results in temperatures exceeding the melting point and hence polymer fusion. In some cases it may be advantageous to set the paddles at an angle to increase backmixing and agitation in the crystallization zone to prevent overheating due to the heat of crystallization.

In practicing the process of this invention, the individual polymer properties must be given consideration in order to overcome the tendency of the prepolymer particles to stick. Sticking is primarily encountered during crystallization, wherein under any given conditions the rate of crystallization is too slow upon heating above the glass transition temperature. In such a situation, the amorphous polymer will stick if not crystallized at a sufficiently fast rate.

As a general rule, homopolymers possess sufficiently rapid rates of crystallization and offer no real problems during thermovane processing. Copolymers, however, inherently have lower rates of crystallization in proportion to the amount of comonomer present. Therefore, in such cases it is necessary to precrystallize the feed to the thermovane at least to about 5 percent crystallinity. Of course, many copolymers will not crystallize at all when too large an amount of both monomers are present. In this regard, the preferred poly(ethylene terephthalate) copolymers which are particularly useful in this invention have
   (a) 80 to 100 equivalent percent of the hydroxyl moieties in the polyester provided by ethylene glycol
   (b) 0 to 1 equivalent percent of the hydroxyl moieties in the polyester provided by polyol having at least 3 hydroxyl groups
   (c) 0 to 20 equivalent percent of the hydroxyl moieties in the polyester provided by diol other than ethylene glycol (d) 0 to 5 equivalent percent of the hydroxyl moieties in the polyester provided by monohydric alcohol (e) 80 to 100 equivalent percent of the carboxyl moieties in the polyester provided by terephthalic acid compound (f) 0 to 1 equivalent percent of the carboxyl moieties in the polyester provided by polycarboxylic acid compound having at least three carboxyl groups (g) 0 to 20 equivalent percent of the carboxyl moieties in the polyester provided by dicarboxylic acid compound other than terephthalic acid (h) 0 to 5 equivalent percent of the carboxyl groups in the polyester provided by monocarboxylic acid (i) 0 to 1 equivalent percent of the total hydroxyl and carboxyl moieties in the polyester provided by a hydroxy carboxylic acid having a total of at least 3 hydroxyl and carboxyl groups with the proviso that when (b), (f) and (i) are each 0 then at least one of (c) and (g) are at least 2 equivalent percent.

The preferred copolymeric polyethylene terephthalate of this invention contains a small concentration of a branching agent [component (b), (f) or (i)] and from 3 to 10 equivalent percent of a second difunctional monomer of the type recited in group (c) and/or group (g).

It is also possible to handle certain essentially non-crystallizable materials which are viscous enough that internal motion is slow at the solid-state polycondensation temperatures employed. An example of such a material would be polyarylates, which when melt polymerized to approximately 0.40 dl/g. inherent viscosity can be solid-state polymerized in a thermovane processor without difficulty.

Because of its versatility, the thermovane processor can be used to accomplish several different tasks usually performed by specialized equipment. The operations of drying, crystallizing, and polymerizing can all be accomplished. In a preferred embodiment, the prepolymer particles can be dried, crystallized, and solid-state polymerized in a first thermovane and thereafter solid-state polymerized further in a second thermovane processor.

An additional advantage of the thermovane processor's versatility resides in the fact that the residence time distribution of the particles within the apparatus can be made to approach "plug flow." This is accomplished by adjusting the vane angles for some of the vanes along the twin-rotating shafts to minimize the amount of backmixing and therefore shorten the residence time distribution tail. This feature is very important when solid-state polymerizing branched copolyesters which tend to form gels as the residence time deviates further from plug flow.

BRIEF DESCRIPTION OF THE DRAWING

FIG. 1 is an elevational view illustrating the preferred mode of operation, having two thermovane processors in series.

FIG. 2 is a cross-sectional view taken along line 2—2 of FIG. 1, illustrating the relative positions of the rotating twin shafts which contain the paddles (vanes).

FIG. 3 is an end view of a single thermovane processor without the end flange, also showing the positions of the rotating twin shafts as they appear at the exterior end of the unit.

FIG. 4 is a top view of a single thermovane processor without a cover, further illustrating the position of the rotating twin shafts and the intermeshing paddles.

FIG. 5 is a cross-sectional view of a single rotating shaft illustrating the paddles attached thereto.

FIG. 6 is a sectional view taken along line 6—6 of FIG. 5, further illustrating the paddle design.

DESCRIPTION OF THE PREFERRED EMBODIMENT

Directing attention to the Drawing, the features of the thermovane processor and its operation will be described in greater detail.

As shown in FIG. 1, the prepolymer particles or pellets can be introduced to the first of two thermovane processors 1 through a feed hopper 2. The flow of particles is regulated by a star valve 3. The manner of feeding is purely one of choice. Each thermovane processor is generally divided into first and second zones which correspond to two hot oil jackets 4 and 6, respectively. The presence of two independent hot oil jackets permits more operational flexibility through greater temperature control. As the particles are conveyed through the processor by a combination of paddle action and gravity, the particle bed 7 (shown by dashed lines) gradually slopes downward toward the discharge tube 8. The height of the particle bed can be controlled by several variables, including feed rates, discharge rates, internal volume configuration, paddle orientation, and the rotational speed of the rotating shafts 9. Through experimentation with residence time distributions for poly-(ethylene terephthalate) crystallization and polymerization, the bed height profile shown in FIG. 1 has been found to be preferable for the first of two thermovanes in series.

Also shown in FIG. 1 are the inlets 11 to a header for hot nitrogen, which provides an inert atmosphere for the polymer particles within the processor. The nitrogen is vented through vents 12. Also shown is the lid 13 or cover for the processor and the end flanges 14.

When the particles leave the first thermovane processor through the discharge tube 8, they are preferably fed directly into a second processor of the same design. For purposes herein, the two hot oil jackets 16 and 17 shall define zones three and four, respectively. The discharge tube 18 preferably contains a star valve 19 for further operational control. Each of the two processors is approximately 7 feet long, 1 foot high, and 1 foot wide, although these dimensions can be larger or smaller as desired.

FIG. 2 illustrates the "W-shaped" cross-section of a thermovane processor and the position of the rotating shafts in relation thereto. Particularly, the hot oil jacket 4 is shown wrapped around the "W-shaped" profile of the processor, forming a header space 21 which runs lengthwise and provides nitrogen gas from the inlets 11. The gas is introduced to the inside of the processor through numerous orifices 22 spaced along the entire length of the header at one-inch intervals. The orifices are about 0.03 inch in diameter.

The dual rotating shafts 9 can be hollow (as shown) and can contain a heating element 23 surrounded by heat transfer cement 24. Such a construction aids in providing proper temperature control, which can be very critical for many operations.

The paddle assemblies 26, which are further illustrated in FIGS. 4-6, can be spaced about 90° apart around the circumference of each shaft in a helical fashion. As shown, the paddles of each shaft must intermesh to provide proper mixing and conveyance without permitting dead spots within the processor. The "W-shape" of the inner walls is particularly important in this regard.

Also illustrated in FIG. 2 is one of several support bars 27 which are uniformly spaced along the length of the processor to provide structural strength to the sidewalls 28. Also shown is the lid 13 which contains two inches of insulation 29 to prevent heat loss.

FIG. 3 is simply an end view of the processor showing the end flange 14 and the twin rotating shafts 9 which extend through the end flange and are connected to a motor (not shown). As indicated, the shafts rotate in opposite directions. Also shown is the lid 13 and a sealing gasket 31 which extends around the entire periphery of the lid.

FIG. 4 more clearly illustrates the relationship between the paddle assemblies 26 of each rotating shaft as viewed from above. As illustrated, the paddle assemblies can be positioned along each shaft in a helical pattern to facilitate conveyance of the particles. The clearance between the sidewall 28 and the blade edge 32 of the paddle blade 33 is preferably about 0.063 inch, but will depend upon the method of fabrication. Similarly, the clearance between paddles as they intermesh can be about 0.20 inch, but this dimension is not of critical importance. However, an important feature of the thermovane processor is the ability to rotate the paddle blades such that the flow of particles through the processor can be regulated. For example, FIGS. 2 and 4 illustrate the paddle blades oriented such that they lie in a plane which includes their respective rotating shafts. It is desirable in certain circumstances to change the orientation of some of the paddle blades in order to increase or decrease the residence time as reflected in the particle bed height. Particularly near the discharge tube, where the particle bed height tends to decrease, some of the paddle blades can be oriented to actually resist the flow, thus raising the particle bed height at that point and therefore also increasing the residence time. The orientation of specific paddle blades will be readily determined without undue experimentation by those skilled in the art and will depend greatly on the particular application and results desired. There are no hard-and-fast rules for this aspect of the invention.

FIG. 5 illustrates the paddle assemblies in greater detail, showing the paddle blades 33 oriented in a plane which is at right angles to the rotating shaft 9. This view is only for purposes of illustration and does not represent a likely paddle blade orientation since the paddle blades would merely slice through the pellet bed and provide very minimal agitation. Also shown are the paddle shaft 34, the jam nut 36, the coupling 37, and the welds 38.

FIG. 6 is a further illustration of the paddle assembly taken along line 6—6 of FIG. 5, showing the relative thickness of the paddle blades and the welds 39 attaching the paddle blade to the paddle shaft. Operating the thermovane processor with paddle blades at different angles enables the processor to agitate the particles independently of conveyance through the unit. Because adequate agitation is critical during drying, crystallization, and solid-stage polymerization, it is mandatory that the paddle assemblies and rotating shaft be operating at conditions tailored for the particular objectives of the given process. The rotational speed of the shafts has a large effect on the residence time and residence time distribution as well as the agitation. By making the proper adjustments to the paddle blade angles, the desired residence time and residence time distribution can be obtained with desired agitation. These adjustments are necessary for obtaining the desired degree of product homogeneity.

EXAMPLES

Although the thermovane processor can be used to upgrade prepolymer particles of a wide variety of polymers, the processor described in the Drawing was specifically designed for poly(ethylene terephthalate) (PET) processing because of its commercial significance. Therefore, although the following examples pertain to PET, they are intended to be illustrative only and not limited to PET. Those skilled in the art will appreciate the applicability of the thermovane processor to other equivalent polymers as well which also can be upgraded in a thermovane processor.

Feedstocks

Two different prepolymer feedstocks were used to carry out the runs set forth below. Both were poly(ethylene terephthalate) branched copolyesters having a degree of crystallinity of about 5 percent. One prepolymer, which had an inherent viscosity of 0.55 dl/g., contained 4 mole percent isophthalic acid (comonomer), 0.20 mole percent trimellitic anhydride (branching agent), and about 200 ppm. antimony polycondensation catalyst. (Mole percent values are based on acid moieties).

The other prepolymer, which had an inherent viscosity of 0.40 dl/g., contained 5 mole percent isophthalic acid (IA), 0.15 mole percent trimellitic ahydride (TMA), and 105 ppm. antimony polycondensation catalyst. This prepolymer was more difficult to process because of the 5° C. decreased softening point due to the higher isophthalic acid content, and also because of its slower solid-state reaction rate due to the lower branching agent and catalyst levels.

The prepolymer particles used for carrying out the following examples were slightly oval-shaped pellets averaging 1.23 mm.×1.44 mm.×2.98 mm. in size. The pellets were partially precrystallized (about 5 percent crystallinity) in order to minimize processing difficulties during the study.

Experimental

A number of continuous runs were made to determine the capabilities of the thermovane processor for upgrading PET prepolymer particles. The conditions and parameters for each of these runs are set forth in the tables that follow.

TABLE I

| Silo Dryer and Two Thermovanes in Series | | | | |
|---|---|---|---|---|
| | FEED | | | |
| Run No. | Inherent Viscosity (dl/g.) | | | Rate (Kg/hr.) |
| 1 | 0.55 | | | 30 |
| 2 | 0.55 | | | 35 |
| 3 | 0.55 | | | 15 |
| 5 | 0.40 | | | 13 |
| | SILO DRYER | | | |
| Top | | Bottom | | Residence |
| Temp (°C.) | N$_2$/PET (Kg/Kg) | Temp (°C.) | N$_2$/PET (Kg/Kg) | Time (hrs.) |
| 100 | 1.25 | 185 | 3.1 | 3.0 |
| 100 | 1.07 | 185 | 2.7 | 2.6 |
| 100 | 2.5 | 185 | 6.25 | 6.0 |

TABLE I-continued

Silo Dryer and Two Thermovanes in Series

| 100 | 2.9 | 185 | 7.2 | 7.0 |
|---|---|---|---|---|

THERMOVANE I

| Zone 1 | | Zone 2 | |
|---|---|---|---|
| Temp (°C.) | N$_2$/PET (Kg/Kg) | Temp (°C.) | N$_2$/PET (Kg/Kg) |
| 223 | 0.5 | 227 | 0.5 |
| 223 | 0.43 | 226 | 0.43 |
| 220 | 1.0 | 219 | 1.0 |
| 218 | 0.67 | 219 | 0.67 |

THERMOVANE I

| Shaft rpm | Hold Up (Kg.) | Residence Time (hrs.) |
|---|---|---|
| 20 | 38 | 1.3 |
| 20 | 38 | 1.1 |
| 8.5 | 37 | 2.5 |
| 8.0 | 37 | 2.85 |

THERMOVANE II

| | Zone 1 | | Zone 2 | |
|---|---|---|---|---|
| Run No | Temp (°C.) | N$_2$/PET (Kg/Kg) | Temp (°C.) | N$_2$/PET (Kg/Kg) |
| 1 | 227 | 0.5 | 216 | 0.5 |
| 2 | 227 | 0.43 | 213 | 0.43 |
| 3 | 220 | 1.0 | 211 | 1.0 |
| 5 | 221 | 0.67 | 211 | 0.67 |

THERMOVANE II

| Shaft rpm | Hold Up (Kg.) | Residence Time (hrs.) | PRODUCT Inherent Viscosity (dl/g.) |
|---|---|---|---|
| 12 | 45 | 1.5 | 0.88 |
| 12 | 45 | 1.3 | 0.79 |
| 8.5 | 45 | 3.0 | 0.99 |
| 8.0 | 45 | 3.5 | 0.68 |

TABLE II

Silo Dryer and One Thermovane

FEED

| Run No. | Inherent Viscosity (dl/g.) | Rate (Kg/hr.) |
|---|---|---|
| 2A | 0.55 | 35 |

SILO DRYER

| Top | | Bottom | | Residence |
|---|---|---|---|---|
| Temp (°C.) | N$_2$/PET (Kg/Kg) | Temp (°C.) | N$_2$/PET (Kg/Kg) | Time (hrs.) |
| 100 | 1.07 | 185 | 2.7 | 2.6 |

THERMOVANE I

| Zone 1 | | Zone 2 | |
|---|---|---|---|
| Temp (°C.) | N$_2$/PET (Kg/Kg) | Temp (°C.) | N$_2$/PET (Kg/Kg) |
| 222 | 0.43 | 223 | 0.43 |

THERMOVANE I

| Shaft rpm | Hold Up (Kg.) | Residence Time (hrs.) | PRODUCT Inherent Viscosity (dl/g) |
|---|---|---|---|
| 20 | 38 | 1.1 | 0.68 |

TABLE III

Two Thermovanes in Series Without Silo Dryer

FEED

| Run No. | Inherent Viscosity (dl/g.) | Rate (Kg/hr.) |
|---|---|---|
| 6 | 0.55 | 30 |

THERMOVANE I

| Zone 1 | | Zone 2 | | | Hold | Residence |
|---|---|---|---|---|---|---|
| Temp (°C.) | N$_2$/PET (Kg/Kg) | Temp (°C.) | N$_2$/PET (Kg/Kg) | Shaft rpm | Up (Kg.) | Time (hrs.) |
| 207 | 0.3 | 220 | 0.3 | 20 | 37 | 1.2 |

THERMOVANE II

| Zone 1 | | Zone 2 | |
|---|---|---|---|
| Temp (°C.) | N$_2$/PET (Kg/Kg) | Temp (°C.) | N$_2$/PET (Kg/Kg) |
| 222 | 0.3 | 211 | 0.3 |

THERMOVANE II

| Shaft rpm | Hold Up (Kg.) | Residence Time (hrs.) | PRODUCT Inherent Viscosity (dl./g) |
|---|---|---|---|
| 12 | 45 | 1.5 | 0.74 |

Directing attention to the results set forth in TABLE I, Runs 1, 2, 3, and 5 illustrate using two thermovanes in series to accomplish crystallization and solid-state polymerization after the prepolymer particles have been dried and partially crystallized in a silo dryer. (Drying is indicated by a change in moisture level). These runs illustrate that a broad slate of product inherent viscosities can be attained by varying the conditions. Run 5 illustrates the ability of the thermovanes to upgrade a low inherent viscosity (0.4) feed. Polymerization is indicated by the change in inherent viscosity. Accomplishment of crystallization is indicated by an increase in density.

Run 2A set forth in TABLE II illustrates the capability of a single thermovane to upgrade prepolymer particles which have been dried. This run is important from a process economics standpoint because it illustrates a low nitrogen usage (0.86 Kg. N$_2$ per Kg. PET) and a short residence time (1.1 hours), while still achieving a reasonable product inherent viscosity (0.68 dl/g.).

Run 6 set forth in TABLE III illustrates the operation of two thermovanes in series performing all three functions of drying, crystallization, and solid-state polymerization while avoiding the pellet agglomeration problem. Such a set-up eliminates the silo dryer and replaces the previously used moving bed reactor for producing upgraded polyester particles. The most important advantage of such a system is an economic one, whereby shorter residence times and lower inert gas (N$_2$) usage is accomplished. Generally, nitrogen usage in the drying zone is based on the moisture level of the feedstock polymer. Nitrogen usage in the polycondensation zone should be minimized for economic reasons. Generally 0.5 kg./kg. should be sufficient, although greater amounts such as one, two, or twenty or more kg./kg. can be used.

Temperatures for each zone of each thermovane will vary with the polyester being processed, but must be kept low enough to prevent sticking and fouling. For the PET copolyesters described herein, the temperatures can fall within the range of from 180° C. to about 235° C.

Essentially the same results as shown herein can be obtained with homopolyesters as well as copolyesters, since homopolyesters do not present as severe a sticking problem as do the copolyesters. Both branched and linear polyesters are suitable. A large advantage of the thermovane processor lies in its ability to prevent sticking at temperatures where other devices, such as vacuum tumble driers, fluid beds, etc. fail. This allows significantly reduced polycondensation times as shown by the following comparisons in Table IV.

TABLE IV

| PET Material | Time Required to Attain 0.85 Inherent Viscosity | |
|---|---|---|
| | 200° C. | 225° C. |
| 0.55 I.V. 0.2% TMA 4.0% IA 200 ppm Sb | 12 hours | 2.2 hours |
| 0.40 I.V. 0.2% TMA 4.0% IA 200 ppm Sb | 24 hours | 5 hours |

Similar advantages of faster rates of polycondensation are realized with linear polyesters. Additionally, the thermovane can be used to solid-state polymerize certain amorphous polyesters such as polyacrylates without agglomeration or sticking.

It will be readily apparent to those skilled in the art that many variations from these examples, shown for purposes of illustration, can be made without departing from the scope of this invention as defined by the following claims to be read in light of the specification.

We claim:

1. A process for upgrading polyester prepolymer particles comprising continuously conveying polyester prepolymer particles through a thermovane processor under an inert gas sweep at a temperature below the softening point of the polyester and sufficient to achieve crystallization and/or solid-state polymerization without sticking of the particles.

2. The process of claim 1 wherein the polyester comprises diol and diacid moieties wherein said diol comprises ethylene glycol and said diacid comprises terephthalic acid.

3. The process of claim 2 wherein the polyester is a homopolymer.

4. The process of claim 2 wherein the polyester is a poly(ethylene terephthalate) copolymer.

5. The process of claim 4 wherein the copolymer comprises moieties of isophthalic acid and trimellitic acid.

6. The process of claim 5 wherein the polyester particles are crystallized and further polymerized in a first thermovane processor and thereafter still further polymerized in a second thermovane processor.

7. A process for upgrading partially crystallized poly(ethylene terephthalate) copolyester particles having a degree of crystallization of at least about 5 percent, said process comprising continuously conveying the particles through two serially-connected thermovane processors, without sticking, under an inert gas sweep and at a temperature below 235° C. wherein the particles are dried, crystallized, and polymerized in the first thermovane processor and thereafter further polymerized in the second thermovane processor.

8. The process of claim 7 wherein the inert gas is nitrogen and flows at a rate of from about 0.5 to about 20 kilograms of nitrogen per kilogram of particles.

9. The process of claim 8 wherein the nitrogen flow rate is from about 1 to about 2 kilograms nitrogen per kilogram of particles.

* * * * *